United States Patent
Dhar et al.

(10) Patent No.: US 10,953,725 B2
(45) Date of Patent: Mar. 23, 2021

(54) METHOD AND SYSTEM FOR HEATING A VEHICLE

(71) Applicant: Ford Global Technologies, LLC, Dearborn, MI (US)

(72) Inventors: Debasish Dhar, Canton, MI (US); Gopichandra Surnilla, West Bloomfield, MI (US); Ross Pursifull, Dearborn, MI (US); Brad Alan VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/131,987

(22) Filed: Sep. 14, 2018

(65) Prior Publication Data
US 2020/0086714 A1  Mar. 19, 2020

(51) Int. Cl.
| | | |
|---|---|---|
| *B60H 1/00* | (2006.01) | |
| *B60H 1/03* | (2006.01) | |
| *B60H 1/32* | (2006.01) | |
| *B60H 1/14* | (2006.01) | |

(52) U.S. Cl.
CPC ......... *B60H 1/034* (2013.01); *B60H 1/00885* (2013.01); *B60H 1/143* (2013.01); *B60H 1/3223* (2013.01); *B60H 1/3227* (2013.01); *B60H 2001/00928* (2013.01); *B60H 2001/00949* (2013.01)

(58) Field of Classification Search
CPC ................ B60H 1/034; B60H 1/00914; B60H 2001/00949; B60H 2001/00928
See application file for complete search history.

(56) References Cited

U.S. PATENT DOCUMENTS

| | | | | |
|---|---|---|---|---|
| 5,706,664 A | * | 1/1998 | Hara .................. | B60H 1/00314 |
| | | | | 62/159 |
| 5,910,157 A | * | 6/1999 | Noda ................. | B60H 1/00914 |
| | | | | 62/133 |
| 6,166,351 A | | 12/2000 | Yamamoto | |
| 8,419,512 B2 | | 4/2013 | Creed et al. | |
| 9,909,795 B2 | | 3/2018 | Shingu | |
| 2005/0120729 A1 | * | 6/2005 | Zhang ..................... | F25B 9/008 |
| | | | | 62/183 |
| 2008/0264088 A1 | | 10/2008 | Hirsch et al. | |

(Continued)

FOREIGN PATENT DOCUMENTS

| | | |
|---|---|---|
| DE | 102011082015 A1 | 3/2013 |
| EP | 2437009 A2 | 4/2012 |

OTHER PUBLICATIONS

Pursifull, R., "Method and System for Heating Vehicle Cabin With Water-Cooled Alternator," U.S. Appl. No. 16/132,063, filed Sep. 14, 2018, 43 pages.

*Primary Examiner* — Eric S Ruppert
(74) *Attorney, Agent, or Firm* — Geoffrey Brumbaugh; McCoy Russell LLP (57) ABSTRACT

Methods and system for providing heat to a vehicle are presented. In one example, a refrigerant loop is operated to heat a passenger cabin via heat generated by a compressor and heat generated by a resistive heating element. The heat that is generated by the compressor and the heat that is generated by the resistive heating element is transferred to a refrigerant before it is transferred to the passenger cabin.

13 Claims, 6 Drawing Sheets

(56) References Cited

U.S. PATENT DOCUMENTS

2015/0101789 A1* 4/2015 Enomoto ................ B60L 1/003
  165/202
2017/0240024 A1* 8/2017 Blatchley ........... B60H 1/00921
2019/0225051 A1* 7/2019 Zenner .................. B60H 1/143

* cited by examiner

METHOD AND SYSTEM FOR HEATING A VEHICLE

FIELD

The present description relates to methods and a system for improving heating of a vehicle. The methods and system may be particularly useful for vehicles that are propelled via an engine that selectively powers a passenger cabin climate control system.

BACKGROUND AND SUMMARY

A vehicle may include an air conditioner to cool a passenger cabin when ambient temperatures are higher. The vehicle may also include a heater core that heats the passenger cabin via engine waste heat when ambient temperatures are lower. However, it may take several to tens of minutes for passengers in the vehicle to notice passenger cabin heating due to the large mass of engine coolant and time it takes to heat an engine. One way to provide a warm passenger cabin is to remotely start the vehicle and increase passenger cabin temperature while vehicle passengers wait in a warm place and the passenger cabin temperature increases. While this solution heats the passenger cabin, it also consumes fuel that might otherwise be used to propel the vehicle. Consequently, the vehicle's fuel economy may be reduced at the expense of passenger comfort. Further, the vehicle occupants may be made to wait to drive.

The inventors herein have recognized the above-mentioned disadvantages and have developed a method for conditioning a vehicle's passenger cabin, comprising: cooling a passenger cabin via a refrigerant in a refrigerant loop in response to a request to cool a vehicle passenger cabin; and heating the refrigerant in the refrigerant loop via a compressor, heating the refrigerant via a resistive heater, and heating the vehicle passenger cabin via the refrigerant in response to a request to heat the vehicle passenger cabin.

By heating refrigerant in a climate control system, it may be possible to increase vehicle passenger cabin heating without having to wait an extended period of time for engine coolant to heat the passenger cabin. The refrigerant may have a much smaller thermal inertia than engine coolant, which allows refrigerant temperature to increase at a faster rate than engine coolant temperature, so that a desired level of heating may be provided to a vehicle passenger cabin sooner than if the vehicle passenger cabin were heated via engine coolant. The refrigerant may be heated via a compressor through heat of compression, and the refrigerant may also be heated via resistive heaters so that a larger amount of energy may be converted into thermal energy for heating the passenger cabin. Consequently, the vehicle passenger cabin may be heated via a low voltage electric energy storage device without flowing high current amounts from the electric energy storage device. In addition, the same refrigerant may also be used to cool the passenger cabin when ambient temperatures are higher. Once the engine coolant is warm due to engine operation, cabin heating would primarily come from the engine since using engine heat is fuel efficient when it is available.

The present description may provide several advantages. Specifically, the approach may improve passenger cabin heating of vehicles. Further, the approach provides for higher levels of vehicle passenger cabin heating via a low voltage electric energy storage device and no more than two resistive heating elements. Additionally, the approach may improve a vehicle's fuel economy during low temperature conditions while simultaneously providing a shorter time to the desired level of passenger cabin heating.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
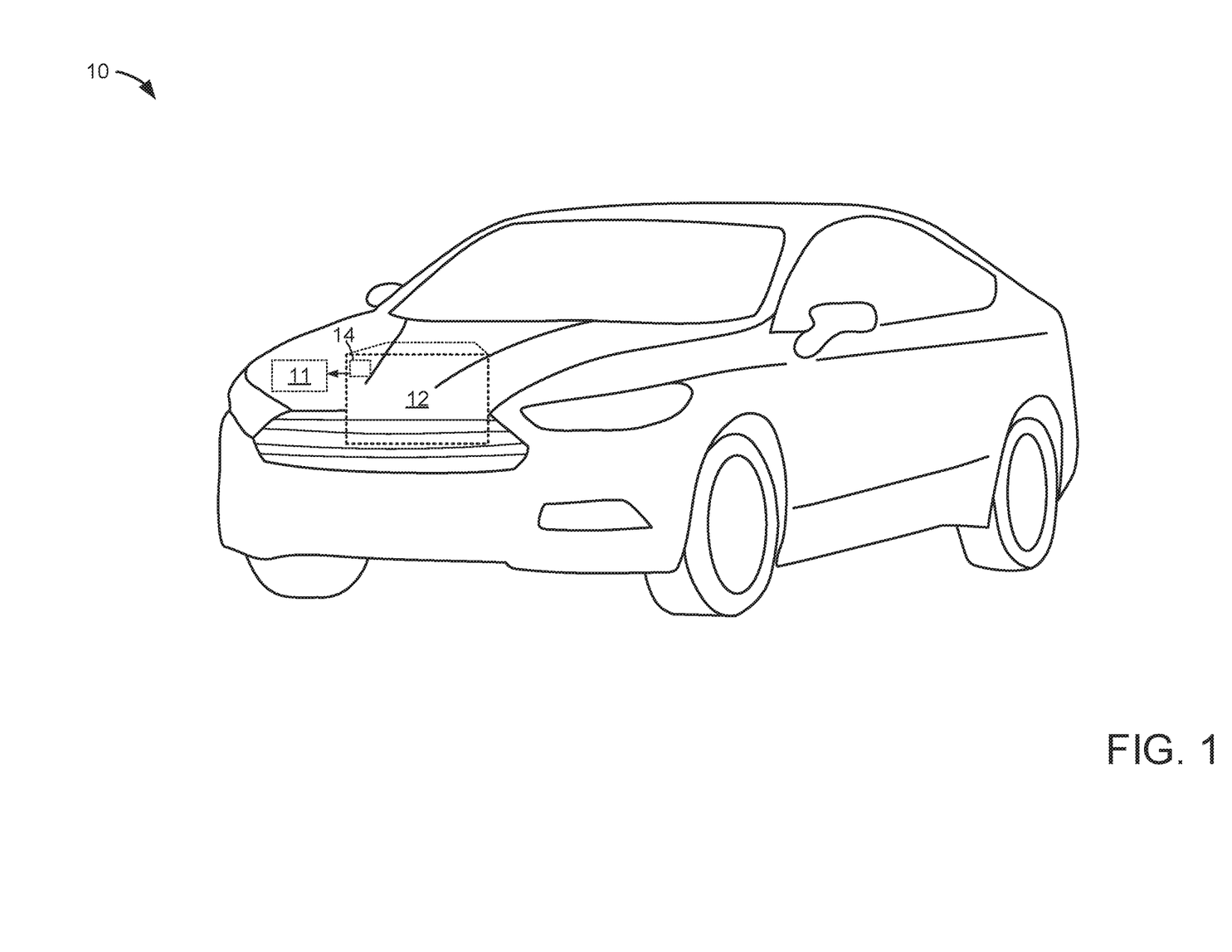
FIG. 1 is a schematic diagram of a vehicle.
Figure 2:
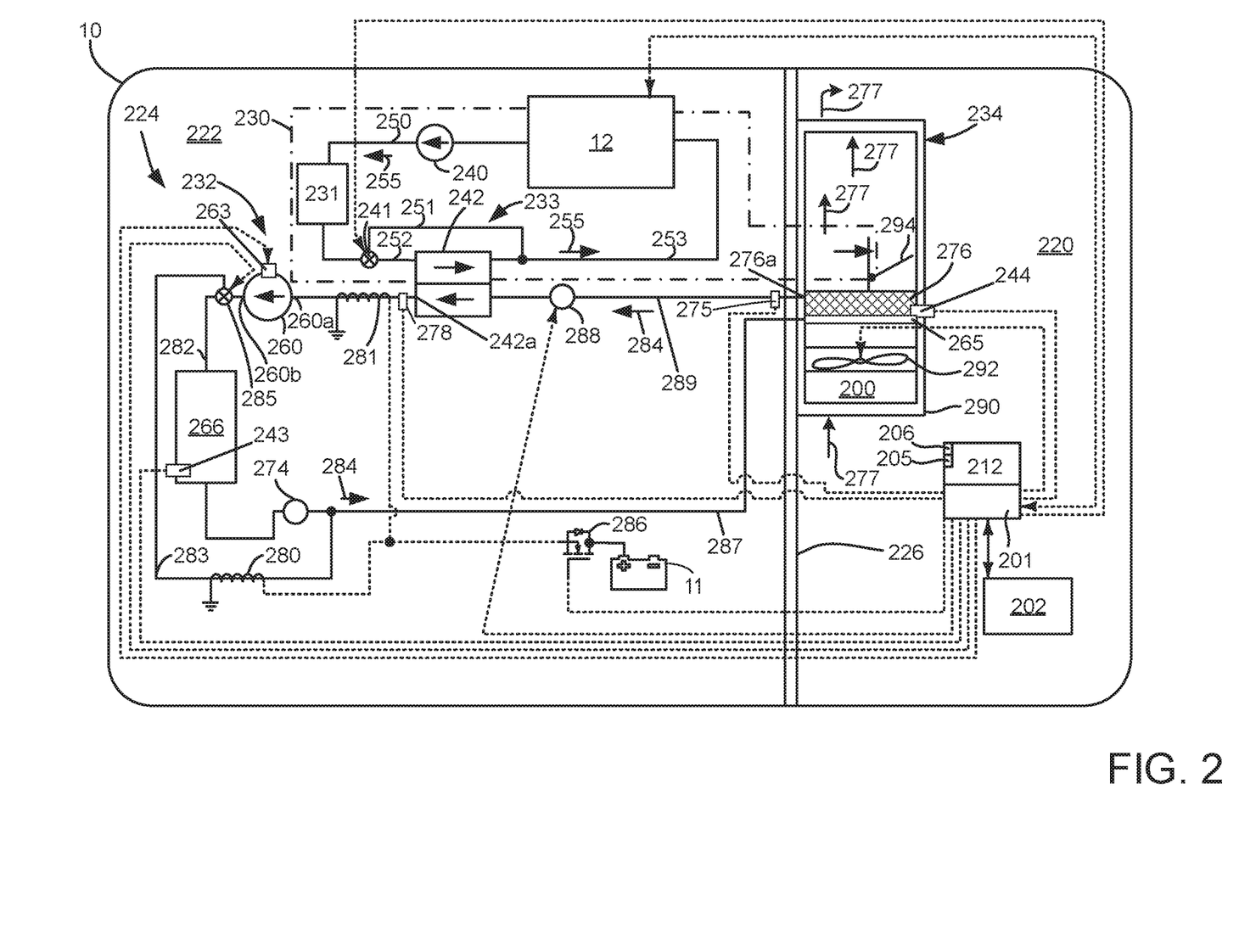
FIG. 2 shows an example vehicle climate control system for the vehicle of FIG. 1.
Figure 3:
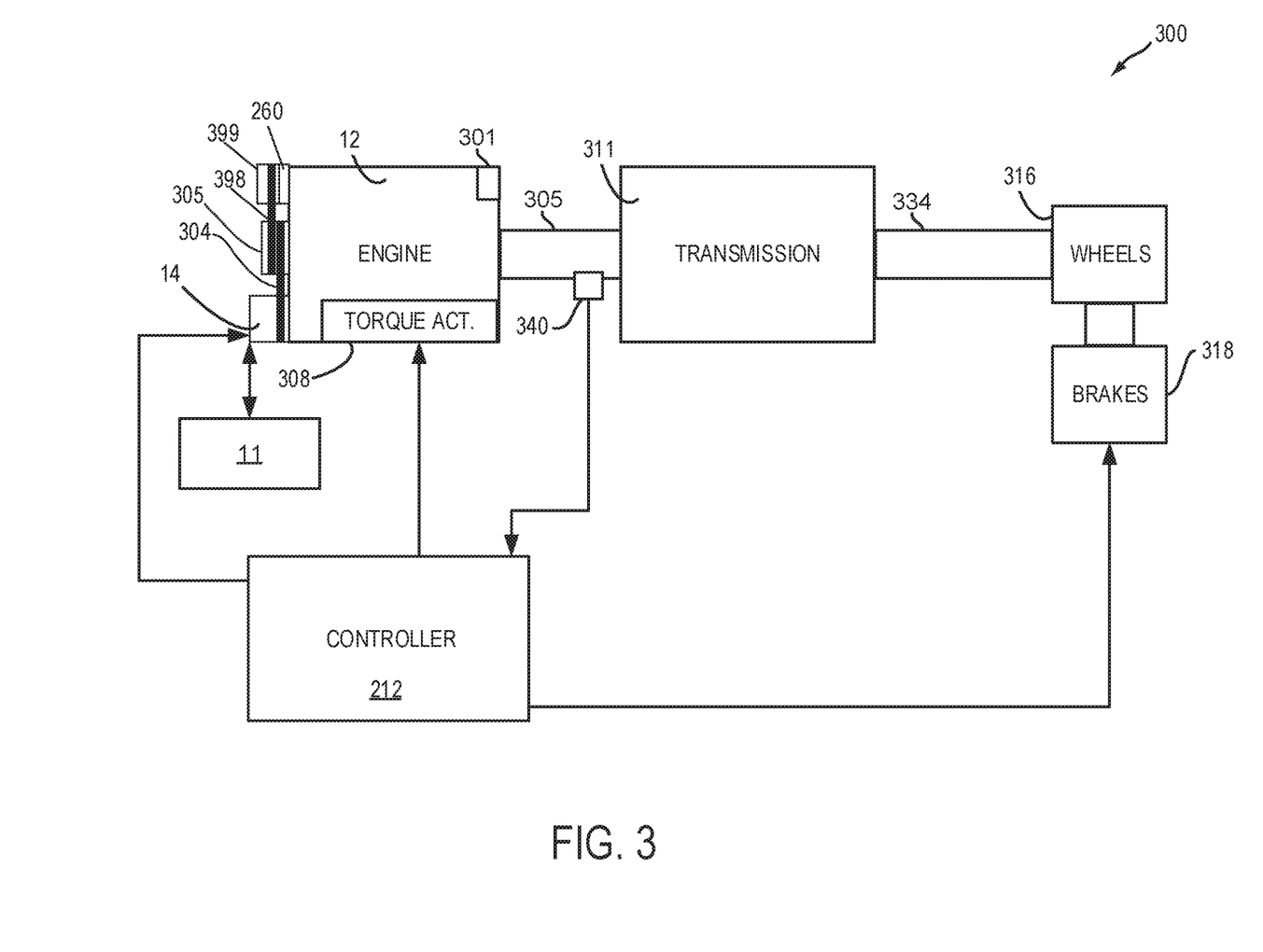
FIG. 3 shows an example vehicle driveline for the vehicle of FIG. 1.

The present description is related to heating a passenger cabin of a vehicle. In particular, refrigerant in a vehicle's refrigerant loop may be heated to warm a passenger compartment to provide rapid passenger cabin heating. The vehicle may be a passenger vehicle as is shown in FIG. 1 or a commercial vehicle (not shown). The vehicle includes a climate control system as shown in FIG. 2. The climate control system may include an engine that is part of a powertrain as shown in FIG. 3. Heat may be provided to the vehicle's passenger cabin according to the method of FIGS. 4 and 5. The vehicle may be heated as shown in the operation sequence of FIG. 6 according to the method of FIGS. 4 and 5.

Referring to FIG. 1, a vehicle 10 including an internal combustion engine 12, an electric machine (e.g., an alternator) 14, and an electrical energy storage device 11 is shown. In one example, the vehicle may be propelled solely via the engine 12. The engine 12 may supply electrical power to the electrical energy storage device 11 via alternator 14. Specifically, the electrical energy storage device 11 may be recharged via engine 12 providing power to electrical machine 14 and electrical machine 14 outputting electrical energy to electric energy storage device 11. Alternatively, electrical energy storage device may be recharged via converting the vehicle's kinetic energy into electrical energy via electrical machine 14 during vehicle deceleration or hill descent. In one example, electrical energy storage device 11 is a low voltage battery (e.g., 12 volt battery). Alternatively, electrical energy storage device 11 may be a capacitor or other storage device.

Referring now to FIG. 2, a vehicle heating system or climate control system 224 is shown. Devices and fluidic passages or conduits are shown as solid lines. Electrical connections are shown as dashed lines.

The vehicle 10 may include a driveline as shown in FIG. 3 or another suitable driveline to propel the vehicle 10 and/or power vehicle components. Vehicle 10 is shown with internal combustion engine 12, and it may be selectively coupled to an electric machine (not shown). Internal combustion engine 12 may combust petrol, diesel, alcohol, hydrogen, or a combination of fuels.

The vehicle 10 may include a passenger compartment 220, an engine compartment 222, and a climate control system 224. The passenger compartment 220 may be within vehicle 10 and it may receive one or more occupants or passengers. A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or control or modify the temperature of air that is circulated in the passenger compartment 220. The climate control system 224 may include a coolant subsystem 230, a refrigerant loop 232, and a ventilation subsystem 234.

The coolant subsystem 230, which may also be referred to as an engine coolant loop or coolant loop, may circulate a liquid coolant, such as glycol, to cool the internal combustion engine 12. For example, waste heat that is generated by the internal combustion engine 12 when the engine is running or operational may be transferred to the coolant and then circulated to radiator 231 to cool internal combustion engine 12. In at least one example, the coolant subsystem 230 may include a coolant pump 240, radiator or heat exchanger 231, and an engine coolant to refrigerant heat exchanger 242. The coolant subsystem 230 includes radiator 231 for transferring thermal energy to the ambient air surrounding the vehicle 10. Coolant subsystem 230 also includes engine coolant to refrigerant bypass valve 241 that directs engine coolant to engine coolant to refrigerating heat exchanger bypass passage 251 while in a first position or to engine coolant to refrigerant heat exchanger passage 252 while in a second position. The engine coolant to refrigerant bypass valve 241, engine coolant to refrigerating heat exchanger bypass passage 251, engine coolant to refrigerant heat exchanger passage 252, and engine coolant to refrigerant heat exchanger 242 may be included in an engine coolant to refrigerant circuit 233. Engine coolant flows from engine 12 to pump 240, from pump 240 via passage 250 to radiator 231, from radiator 231 to engine coolant to refrigerant heat exchanger 242 via passage 252. Alternatively, engine coolant flows from the engine to radiator 213 and from radiator 231 through engine coolant to refrigerant heat exchanger bypass passage 251 before returning back to engine 12 via passage 253. Engine coolant flows through coolant subsystem 230 in the direction of arrows 255.

The coolant pump 240 may circulate coolant through the coolant subsystem 230. The coolant pump 240 may be powered by an electrical or non-electrical power source. For example, the coolant pump 240 may be operatively coupled to an internal combustion engine 12 via a belt, or alternatively may be driven by an electrically powered motor. The coolant pump 240 may receive coolant from the internal combustion engine 12 and circulate the coolant in a closed loop. For example, when the climate control system 224 is in a heating mode, coolant may be routed from the coolant pump 240 to the radiator 231 and to engine coolant to refrigerant heat exchanger 242 and then back to the internal combustion engine 12.

The engine coolant to refrigerant heat exchanger 242 may facilitate the transfer of thermal energy between the coolant subsystem 230 and the refrigerant loop 232. In particular, heat may be transferred from engine 12 to refrigerant loop 232. The engine coolant to refrigerant heat exchanger 242 may be part of the coolant subsystem 230 and the refrigerant loop 232. The engine coolant to refrigerant heat exchanger 242 may have any suitable configuration. For example, the engine coolant to refrigerant heat exchanger 242 may have a plate-fin, tube-fin, or tube-and-shell configuration that may facilitate the transfer of thermal energy from engine coolant subsystem 230 to refrigerant loop 232 without mixing or exchanging the heat transfer fluids in the coolant subsystem 230 and refrigerant subsystem 232. In some examples, a heater core (not shown) may be included in the coolant subsystem 230 and it may transfer thermal energy from the coolant to air in the passenger compartment 220.

The refrigerant loop 232 may transfer thermal energy to or from the passenger compartment 220 and from the coolant subsystem 230. In at least one example, the refrigerant loop 232 may be configured as a vapor compression air conditioning system in which a fluid is circulated through the refrigerant loop 232 to transfer thermal energy to or from the passenger compartment 220. The refrigerant loop 232 may operate in various modes, including, but not limited to a cooling mode and a heating mode. In the cooling mode, the refrigerant loop 232 may circulate a heat transfer fluid, which may be called a refrigerant 265, to transfer thermal energy from inside the passenger compartment 220 to outside the passenger compartment 220. In a heating mode, the refrigerant loop 232 may transfer thermal energy from the refrigerant to the interior heat exchanger 276 and passenger cabin 220. Temperature sensor 244 senses a temperature of inside heat exchanger 276.

In heating mode, refrigerant loop 232 may include first resistive heater 281, a pump or compressor 260, an outside heat exchanger bypass valve 285, a second resistive heater 280, interior heat exchanger 276, a refrigerant throttling valve 288, and an engine coolant to refrigerant heat exchanger 242. Optionally, throttling valve (which can be fully opened to prevent substantial restriction in cooling mode) can be located downstream of 242 and 281. Refrigerant in a gaseous phase enters inlet 260a of compressor 260 and exits at outlet 260b before reaching outside heat exchanger bypass valve 285. Compressor 260 rotates and compresses the gaseous phase refrigerant, thereby heating the gaseous phase refrigerant via compression heating. Displacement of compressor 260 may be adjusted via displacement actuator 263. Outside heat exchanger bypass valve 285 directs gaseous phase refrigerant into bypass passage 283 while refrigerant does not substantially flow (e.g., less than a threshold amount of flow) through outside heat exchanger 266. Temperature sensor 243 senses a temperature of outside heat exchanger 266 (or in some cases may be an ambient temperature sensor). The gaseous refrigerant is heated via resistive heater 280 that converts electrical energy into thermal energy. The heated refrigerant then flows to interior heat exchanger 276 where thermal energy is transferred from the heated refrigerant to air in passenger cabin 220. The refrigerant remains in a gaseous phase after passing through interior heat exchanger 276 and then it flows into engine coolant to refrigerant throttling valve 288 which is partially open. The refrigerant remains in a gaseous state after passing thorough the refrigerant throttling valve 288 and then it then flows to engine coolant to refrigerant heat exchanger 242 where thermal energy may be transferred from engine coolant to the refrigerant. Throttling valve 288 lowers the refrigerant pressure dramatically with little effect on refrigerant temperatures. This prepares the gas entering the compressor to receive compression heating. Engine coolant to refrigerant bypass valve 241 directs engine coolant to flow through engine coolant to refrigerant heat exchanger 242 when refrigerant temperature from interior heat exchanger 276 is less than a threshold. The gaseous phase refrigerant exits the engine coolant to refrigerant heat exchanger 242 and then it enters first resistive heater 281 while still in a gaseous phase where it is heated via electrical energy that has been converted into thermal energy. The refrigerant exits resistive heater 281 in a gaseous phase. The preferred place to add resistive heat is post-compression. However, the compressor may have a minimum temperature for durability. Coolant heating via 242 is an economical alternative to maintaining a minimum temperature at the compressor inlet. Low voltage electrical energy storage device 11 (e.g., a 12 volt battery) supplies electrical energy to first and second resistive heaters. Thus, in a heating mode, refrigerant is circulated through refrigerant loop 232 while it is maintained in a gaseous phase without having changed state into a liquid state.

In cooling mode, refrigerant loop 232 may include pump or compressor 260, an outside heat exchanger bypass valve 285, an outside heat exchanger 266 (e.g., condenser in cooling mode), an expansion (a.k.a. throttle) valve 274, interior heat exchanger 276 (e.g., an evaporator in cooling mode), a refrigerant throttling valve 288 (which provides little pressure drop in cooling mode), engine coolant to refrigerant heat exchanger 242, and second resistive heater 280. Refrigerant in a gaseous phase enters inlet 260a of compressor 260 and exits at outlet 260b before reaching outside heat exchanger bypass valve 285. Compressor 260 rotates and compresses the gaseous phase refrigerant, thereby heating the gaseous phase refrigerant via compression heating. Outside heat exchanger bypass valve 285 directs gaseous phase refrigerant into outside heat exchanger 266 where the gaseous phase refrigerant is cooled so that it exits outside heat exchanger 266 in a substantially liquid phase (e.g., greater than 75% liquid). The liquid phase refrigerant expands and cools further as it passes through expansion valve 274 into the evaporator 276 such that the refrigerant changes back into a gaseous phase. The bulk of the phase change with its cooling effect occurs within the evaporator 276. The gaseous phase cooled refrigerant then flows to interior heat exchanger 276 (functioning as an evaporator) where thermal energy is transferred from the passenger cabin to the refrigerant. The refrigerant exits the evaporator in a gaseous phase after passing through interior heat exchanger 276 and then it flows into engine coolant to refrigerant heat exchanger 242 where it is not heated via the engine. The gaseous phase refrigerant then flows through the refrigerant throttling valve 288, which is fully open thus not substantially dropping the vapor's pressure. The refrigerant remains in a gaseous phase after it exits the refrigerant throttling valve 288 and then it enters the engine coolant to refrigerant heat exchanger 242 where it is not heated by engine coolant. The gaseous phase refrigerant exits the engine coolant to refrigerant heat exchanger and then it enters first resistive heater 281, which is off. The gaseous phase refrigerant then enters the inlet of compressor 260 to be compressed again. Refrigerant circulates in a direction indicated by arrows 284.

The pump 260, which may also be called a compressor, may pressurize and circulate the refrigerant through the refrigerant loop 232. The pump 260 may be powered by an electrical or non-electrical power source. For example, the pump 260 may be operatively coupled to internal combustion engine 12 or driven by an electrically powered motor.

The outside heat exchanger bypass valve 285 may be positioned between the pump 260 and the outside heat exchanger 266. The bypass path 283 may permit most refrigerant to bypass the expansion valve 274 and the exterior heat exchanger 266 when the outside heat exchanger bypass valve 285 is in a second position. The outside heat exchanger bypass valve 285 may be operated a first position to stop refrigerant flow through bypass passage 283 so that refrigerant passes through passage 282 and outside heat exchanger 266.

The exterior heat exchanger 266 may be positioned outside the passenger compartment 220. In a cooling mode or air conditioning context, the exterior heat exchanger 266 may function as a condenser and may transfer heat to the surrounding environment to condense the refrigerant from a vapor to liquid.

The interior heat exchanger 276 may be fluidly connected to the expansion valve 274 via passage 287. The interior heat exchanger is also fluidly connected to refrigerant throttling valve via passage 289. The interior heat exchanger 276 may be positioned inside the passenger compartment 220. In a cooling mode or air conditioning context, the interior heat exchanger 276 may function as an evaporator and may receive heat from air in the passenger compartment 220 to vaporize the refrigerant. In the heating mode, the interior heat exchanger 276 transfers heat from the refrigerant to air in the passenger cabin 220.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air from inside the passenger compartment 220 and recirculate such air through the ventilation subsystem 234. One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned downstream of the interior heat exchanger 276. The temperature door 294 may block or permit airflow through the interior heat exchanger 276 to help control the temperature of air in the passenger compartment 220. For example, the temperature door 294 may permit airflow through the interior heat exchanger 276 in the heating mode such that heat may be transferred from the refrigerant to air passing through the interior heat exchanger 276. This heated air may then be provided to a plenum for distribution to ducts and vents or outlets located in the passenger compartment 220. The temperature door 294 may be moved between a plurality of positions to provide air having a desired temperature.

Figure 4:
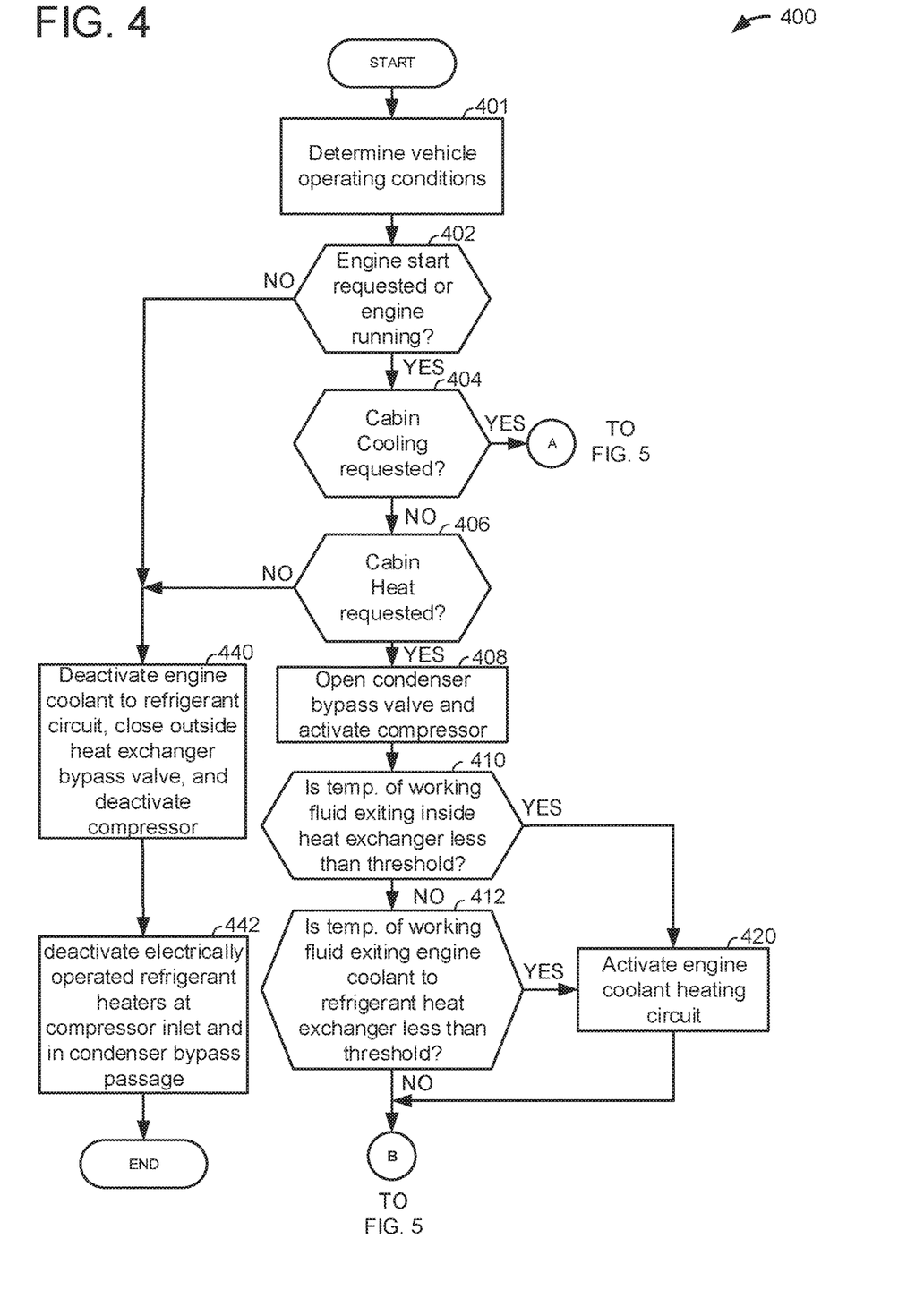
FIGS. 4 and 5 shows a method for operating a vehicle climate control system.
Figure 5:
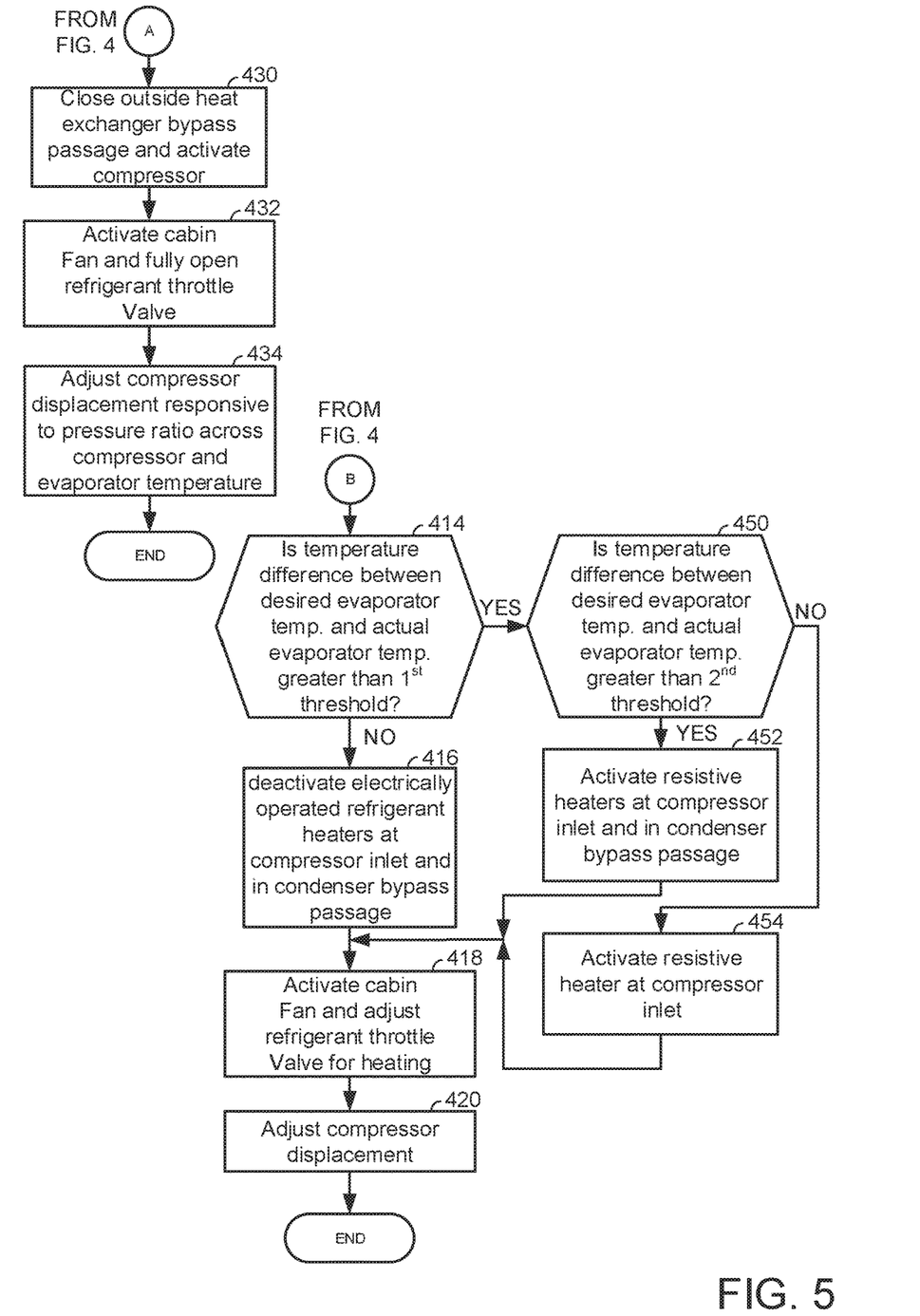

Controller 212 includes executable instructions of the method in FIGS. 4 and 5 to operate the valves, fans, and pumps or compressors of the system shown in FIG. 2 in the physical world. Controller 212 includes inputs and outputs 201 to interface with devices in the system of FIG. 2. Controller 212 also includes a central processing unit 205 and non-transitory memory 206 for executing the method of FIGS. 4 and 5. For example, controller 212 may activate transistor 286 to supply electrical current to first and second resistive heaters 280 and 281. Further, controller may selectively activate and deactivate compressor 260 and change a position of refrigerant throttling valve 288. Controller 12 may also receive output of pressure sensor 275 to determine a pressure of refrigerant at an outlet 276a of interior heat exchanger 276. Controller 12 may also receive output of pressure sensor 278 to determine a pressure of refrigerant at an outlet 242a of engine coolant to refrigerant heat exchanger 242. A human driver of the vehicle may provide input to and receive vehicle information from human/machine interface 202. Human/machine interface may be a pushbutton, key switch, display panel, or other known human/machine interface.

Referring now to FIG. 3, a block diagram of a vehicle driveline 300 in vehicle 10 is shown. Driveline 300 may be powered by engine 12. Engine 12 may be started with an engine starting system including starter 301. Engine 12 may rotate alternator 14 via crankshaft 305 and belt 304. Alternator 14 may supply electrical power to electric energy storage device 11. Engine 12 may also rotate compressor 260 via belt 398 when compressor clutch 399 is closed. Further, engine 12 may generate or adjust torque via torque actuator 308, such as a fuel injector, throttle, camshaft, etc.

An engine output torque may be transmitted to transmission 311 via crankshaft 305. Transmission 311 includes gear clutches (not shown) for adjusting a transmission gear ratio. The gear clutches may be selectively engaged to propel vehicle 10. Torque output from the automatic transmission 311 may in turn be relayed to wheels 316 to propel the vehicle via output shaft 334. Output shaft 334 delivers torque from transmission 311 to wheels 316. Transmission 308 may transfer an input driving torque to the wheels 316.

Further, a frictional force may be applied to wheels 316 by engaging wheel friction brakes 318. In one example, wheel friction brakes 318 may be engaged in response to the driver pressing his/her foot on a brake pedal (not shown). In other examples, controller 212 or a controller linked to controller 12 may apply engage wheel friction brakes. In the same way, a frictional force may be reduced to wheels 316 by disengaging wheel friction brakes 318 in response to the driver releasing his/her foot from a brake pedal. Further, vehicle brakes may apply a frictional force to wheels 316 via controller 212 as part of an automated engine stopping procedure.

Controller 212 may be programmed to receive inputs from engine 12 and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from alternator 14 by adjusting current flowing to and from alternator windings as is known in the art. Engine speed may be sensed via speed sensor 340. The controller 212 receives signals from the various sensors shown in FIGS. 1-3 and employs the actuators shown in FIGS. 1-3 to adjust vehicle operation based on the received signals and instructions stored in memory of controller 212.

Thus, the system of FIGS. 1-3 provides for a vehicle system, comprising: an engine including a cooling system with an engine coolant to refrigerant heat exchanger and a first bypass passage and a first bypass valve arranged in the cooling system in parallel with the engine coolant to refrigerant heat exchanger; a refrigerant loop including a first resistive refrigerant heating element, a first refrigerant to air heat exchanger, a second refrigerant to air heat exchanger, a compressor, and the engine coolant to refrigerant heat exchanger. The vehicle system includes where at first resistive refrigerant heating element is positioned between an inlet of the compressor and the engine coolant to refrigerant heat exchanger. The vehicle system further comprises a second resistive refrigerant heating element arranged in a second bypass passage that is arranged in parallel with the first refrigerant to air heat exchanger. The vehicle system further comprises a second bypass valve coupled to the second bypass passage and a refrigerant throttling valve arranged in the refrigerant loop between the second refrigerant to air heat exchanger and the engine coolant to refrigerant heat exchanger. The vehicle system further comprises a controller and executable instructions stored in non-transitory memory to activate the a first resistive refrigerant heating element and the second resistive refrigerant heating element responsive to a request for passenger cabin heating. The vehicle system further comprises additional instructions to operate the second bypass valve to permit refrigerant to flow through the second bypass passage in response to the request for passenger cabin heating.

Referring now to FIGS. 4 and 5, a flowchart of a method for heating and cooling a passenger cabin of a vehicle is shown. The method of FIGS. 4 and 5 may be stored as executable instructions non-transitory memory in the system of FIGS. 1-3. Further, the method of FIGS. 4 and 5 may provide the operating sequence shown in FIG. 6. Portions of the method of FIGS. 4 and 5 may include changing operating states of devices in the physical world.

At 401, method 400 determines vehicle operating conditions from sensors and actuators. In one example, method 400 determines ambient temperature, pressures in a refrigerant loop, engine coolant temperature, desired passenger cabin temperature, refrigerant temperatures, and engine operating state (e.g., on (combusting fuel and rotating) or off (not combusting fuel and not rotating)). Method 400 proceeds to 402 after determining vehicle operating conditions.

At 402, method 400 judges whether or not the engine is running (e.g., rotating and combusting fuel) or if an engine start is requested. In one example, method 400 may judge that an engine start request is present if there is input to a human/machine interface that indicates an engine start request is present. Further, method 400 may judge that the engine is running if engine speed is greater than a threshold speed and fuel is being injected to the engine. If method 400 judges that an engine start is requested or that the engine is running, the answer is yes and method 400 proceeds to 404. Otherwise, the answer is no and method 400 proceeds to 440.

At 440, method 400 deactivates the engine coolant to refrigerant circuit by adjusting the engine coolant to refrigerant bypass valve to a position or state where engine coolant does not flow through the engine coolant to refrigerant heat exchanger. Method 400 also deactivates the compressor by opening the compressor clutch. Method 400 also adjusts a position or state of the outside heat exchanger bypass valve so that refrigerant does not flow through the outside heat exchanger bypass passage. Method 400 proceeds to 442.

At 442, method 400 deactivates the first and second resistive heaters via ceasing electric current flow to the heaters. The actions taken at 440 and 442 may conserve energy and precondition the vehicle for engine starting and operation during warm ambient temperature conditions when less energy may be consumed to start the engine. Method 400 proceeds to exit.

At 404, method 400 judges whether or not passenger cabin cooling is requested. Passenger cabin cooling may be requested via a human/machine interface or via a controller determining that passenger cabin temperature is higher than a threshold temperature. If method 400 judges that passenger cabin cooling is requested, the answer is yes and method 400 proceeds to 430. Otherwise, the answer is no and method 400 proceeds to 406.

At 430, method 400 closes off the outside heat exchanger bypass passage so that refrigerant flows through the outside heat exchanger and not through the outside heat exchanger bypass passage. This valve position selection configures the system into the normal cabin cooling mode found in many vehicles. The outside heat exchanger bypass passage is closed off by adjusting an operating state of the outside heat exchanger bypass valve. In addition, method 400 activates the compressor. The compressor may be activated by closing a clutch or supplying electrical current to the compressor. The compressor rotates when it is activated. Method 400 proceeds to 432.

At 432, method 400 activates the cabin fan and fully opens the refrigerant throttling valve. The refrigerant throttling valve is fully opened to increase efficiency of the refrigerant loop and the cabin fan is activated to circulate and cool air within the passenger cabin. Method 400 proceeds to 434.

At 434, method 400 adjusts the displacement of the refrigerant loop compressor responsive to a pressure ratio across the compressor and temperature of the evaporator. In one example, the compressor displacement may be increased if the pressure ratio across the compressor is less than a first threshold pressure. The compressor displacement may be decreased if the pressure ratio across the compressor is greater than a second threshold pressure. The compressor displacement may be decreased if inside heat exchanger temperature is less than a first threshold temperature. The compressor displacement may be increased if inside heat exchanger temperature is greater than a second threshold temperature. Method 400 proceeds to exit.

At 406, method 400 judges if cabin heat is requested. Passenger cabin heating may be requested via a human/machine interface or via a controller determining that passenger cabin temperature is lower than a threshold temperature. If method 400 judges that passenger cabin heating is requested, the answer is yes and method 400 proceeds to 408. Otherwise, the answer is no and method 400 proceeds to 440.

At 408, it is concluded that rapid cabin heating is requested and actions are taken to deliver compressor heat of compression to the vehicle cabin. Optionally, one may choose to activate unrelated [air heating or coolant heating based] electrical resistance heating, if available. Further, at 408, method 400 adjusts the operating state of the outside heat exchanger bypass valve to allow refrigerant to flow through the outside heat exchanger bypass passage, thereby bypassing the exterior heat exchanger and the expansion valve so that refrigerant temperature and pressure is not reduced via the outside heat exchanger and expansion valve. In one example, method 400 adjusts the outside heat exchanger bypass valve to a second position which allows refrigerant to flow through the outside heat exchanger bypass valve without flowing through the outside heat exchanger and the expansion valve. Method 400 also activates the compressor via closing the compressor clutch or supplying electrical current to the compressor. Method 400 proceeds to 410.

At 410, method 400 judges if a temperature of the refrigerant (e.g., the working fluid) exiting the inside heat exchanger is less than a threshold temperature (e.g., 5° C.). If so, the answer is yes and method 400 proceeds to 420. Otherwise, the answer is no and method 400 proceeds to 412. The concept here is to keep the fluid temperature into the compressor above a minimum temperature due to concerns for compressor durability. To minimize fuel consumption, one may use engine coolant to do this. However, if the engine coolant to too cold to accomplish this objective, electric heating of the refrigerant may be used. Thus, coolant heating may be first applied followed by electrical heating. If coolant is sufficiently above the threshold temperature, it may be applied alone for heating the fluid. If the threshold temperature is met, use no additional heating may be provided.

At 420, method 400 activates the engine coolant to refrigerant circuit to allow engine coolant to flow though the engine coolant to refrigerant heat exchanger. By allowing engine coolant to flow through the engine coolant to refrigerant heat exchanger, thermal energy may be transferred from the engine coolant to the refrigerant so that a temperature of refrigerant entering the compressor may be maintained above a threshold temperature so that the compressor does not degrade at a faster rate than may be desired. The engine coolant to refrigerant circuit may be activated by adjusting a position of the engine coolant to refrigerant bypass valve to a second position. Method 400 proceeds to 414.

At 412, method 400 judges if a temperature of the refrigerant (e.g., the working fluid) exiting the engine coolant to refrigerant heat exchanger is less than a threshold temperature (e.g., -3° C.). If so, the answer is yes and method 400 proceeds to 420. Otherwise, the answer is no and method 400 proceeds to 414.

At 414, method 400 judges if a temperature difference between a desired interior heat exchanger temperature and an actual interior heat exchanger temperature is greater than a first threshold temperature. The desired interior heat exchanger temperature may be determined from a desired passenger cabin temperature. For example, a table of desired interior heat exchanger temperatures may be referenced or indexed via a desired passenger cabin temperature and the table or function outputs a desired interior heat exchanger temperature. The first threshold temperature may be empirically determined based on passenger comfort and other factors. In one example, the first threshold temperature is 10° C. If method 400 judges that a temperature difference between a desired interior heat exchanger temperature and an actual interior heat exchanger temperature is greater than a first threshold temperature, then the answer is yes and method 400 proceeds to 450. Otherwise, the answer is no and method 400 proceeds to 416.

At 416, method 400 deactivates the resistive refrigerant heaters that are positioned at the compressor inlet and in the outside heat exchanger bypass passage. The heaters are deactivated to conserve electrical power while the compressor and/or a heater core may provide sufficient heat to the passenger cabin. Method 400 proceeds to 418.

At 418, method 400 activates the cabin fan and adjusts a position of the refrigerant throttle to support cabin heating. The refrigerant throttle may be adjusted to a partially open position. In one example, the refrigerant throttle is adjusted to a position that provides a maximum amount of thermal energy to the interior heat exchanger. The position may be empirically determined via adjusting a position of the refrigerant throttle and monitoring interior heat exchanger temperature. The position may be stored in controller memory. Method 400 proceeds to 420 after adjusting the refrigerant throttle position.

At 420, method 400 adjusts a displacement of the compressor. In particular, if a pressure at the outlet of the compressor exceeds a threshold pressure (e.g., 3200 kPa) the compressor displacement is reduced or the compressor clutch is opened. If a pressure at the inlet of the compressor exceeds a threshold pressure (e.g., 1800 kPa) the compressor displacement is reduced or the compressor clutch is opened. Method 400 proceeds to exit.

At 450, method 400 judges if a temperature difference between a desired interior heat exchanger temperature and an actual interior heat exchanger temperature is greater than a second threshold temperature. The second threshold temperature may be empirically determined based on passenger comfort and other factors. In one example, the second threshold temperature is 15° C. If method 400 judges that a temperature difference between a desired interior heat exchanger temperature and an actual interior heat exchanger temperature is greater than a second threshold temperature, then the answer is yes and method 400 proceeds to 452. Otherwise, the answer is no and method 400 proceeds to 454.

At 452, method 400 activates the resistive refrigerant heaters that are positioned at the compressor inlet and in the outside heat exchanger bypass passage. By activating both the heater that is positioned at the compressor inlet and the heater that is positioned in the outside heat exchanger bypass passage, the maximum amount of electrical energy from the low voltage electric energy storage device may be converted into thermal energy to heat the refrigerant. The heat from the resistive refrigerant heaters plus heat from the compressor may provide 5 kW (kilowatts) of thermal energy to the passenger cabin. Thus, once the minimum compressor inlet temperature is met, then 2.6 kW of heat may be provided from heat of compression and 2.4 kW via electrical heating. Optionally the electrical heat may be distributed between heating the refrigerant, direct air heating, and electrical heating of the coolant flowing into the heater core. Each of the resistive heaters may provide 1.2 kW of thermal energy to the passenger cabin and the compressor may provide the remaining 2.6 kW of thermal energy to the passenger cabin via the heat of compression. The two resistive heaters provide heat to the refrigerant rather than engine coolant to increase system efficiency. Further, since the resistive heaters are supplied electrical current via a low voltage electric energy source, a desired amount of heating may be provided with the resistive heaters consuming 100 amperes or less of electrical current. In this way, 5 kW of thermal energy may be provided to the passenger cabin via an actual total of only two resistive heaters powered via a low voltage battery and a compressor. Method 400 proceeds to 418.

At 454, method 400 activates the resistive refrigerant heater that is positioned at the compressor inlet. By activating the heater that is positioned at the compressor inlet, refrigerant entering the compressor may be maintained above a threshold temperature to reduce the possibility of compressor degradation. The heat from the resistive refrigerant heater plus heat from the compressor may provide 3.8 kW (kilowatts) of thermal energy to the passenger cabin. The resistive heater may provide 1.2 kW of thermal energy to the passenger cabin and the compressor may provide the remaining 2.6 kW of thermal energy to the passenger cabin via the heat of compression. Current supplied from the electric energy storage device is maintained below a threshold (e.g., 100 amperes). Method 400 proceeds to 418.

In this way, it may be possible to provide nearly instantaneous passenger cabin heating via refrigerant of a climate control system (e.g., a passenger cabin air conditioning system) without having to install and operate a heat pump that switches operation of a heat exchanger between being an evaporator and being a condenser. Further, engine coolant is not heated by the refrigerant so that heat transfer to the passenger cabin air is provided via a fluid with lower inertia so that the passenger cabin may be heated more rapidly. It may be noted that a heat pump typically works with a phase change of the working fluid. However, to heat via heat of compression as described herein, no phase change occurs. Nevertheless, the inventors recognized that the objective is to provide high levels of instant heat until the engine coolant is warm. As such, the objective is not solely energy efficiency, but rapid passenger cabin heating at high heating power levels at modest cost. The present system and method may fulfill such objectives.

Thus, the method of FIGS. 4 and 5 provide for a method for controlling passenger cabin conditions, comprising: cooling a passenger cabin via a refrigerant in a refrigerant loop in response to a request to cool a vehicle passenger cabin; and heating the refrigerant in the refrigerant loop via a compressor, heating the refrigerant via a resistive heater, and heating the vehicle passenger cabin via the refrigerant in response to a request to heat the vehicle passenger cabin. The method further comprises heating the refrigerant via engine coolant. The method further comprises activating the resistive heater via a controller in response to the request to heat a passenger cabin of a vehicle. The method further comprises flowing refrigerant from a compressor through a first refrigerant to air heat exchanger and then to an expansion valve before flowing the refrigerant through a second refrigerant to air heat exchanger and an engine coolant to refrigerant heat exchanger when cooling the passenger cabin. The method further comprises flowing the refrigerant from the engine coolant to refrigerant heat exchanger to the compressor while engine coolant is not flowing through an engine coolant to refrigerant heat exchanger. The method further comprises flowing refrigerant from a compressor through a first refrigerant to air heat exchanger bypass passage and then to through a second refrigerant to air heat exchanger and an engine coolant to refrigerant heat exchanger when heating the passenger cabin. The method further comprises flowing the refrigerant from the engine coolant to refrigerant heat exchanger to the compressor while engine coolant is flowing through an engine coolant to refrigerant heat exchanger.

The method of also provides for controlling passenger cabin conditions, comprising: cooling a passenger cabin via a refrigerant in a refrigerant loop in response to a request to cool a passenger cabin, the refrigerant changing from a gases phase to a liquid phase when the passenger cabin is being cooled; and heating the refrigerant in the refrigerant loop via a compressor, heating the refrigerant via a first resistive heater, and heating a passenger cabin via the refrigerant in response to a request to heat the passenger cabin, the refrigerant maintained in a gaseous phase throughout the refrigerant loop when the passenger cabin is being heated. The method further comprises heating the refrigerant via a second resistive heater in response to the request to heat the passenger cabin. The method further comprises fully opening a refrigerant throttling valve via a controller while cooling the passenger cabin. The method further comprises partially closing the refrigerant throttling valve via the controller while heating the passenger cabin. The method further comprises reducing a displacement of the compressor via the controller in response to a pressure at an outlet of the compressor exceeding a first threshold. The method further comprises reducing a displacement of the compressor via the controller in response to a pressure at an inlet of the compressor exceeding a second threshold. The method further comprises flowing coolant through an engine coolant to refrigerant heat exchanger in response to the request to heat the passenger cabin.

Figure 6:
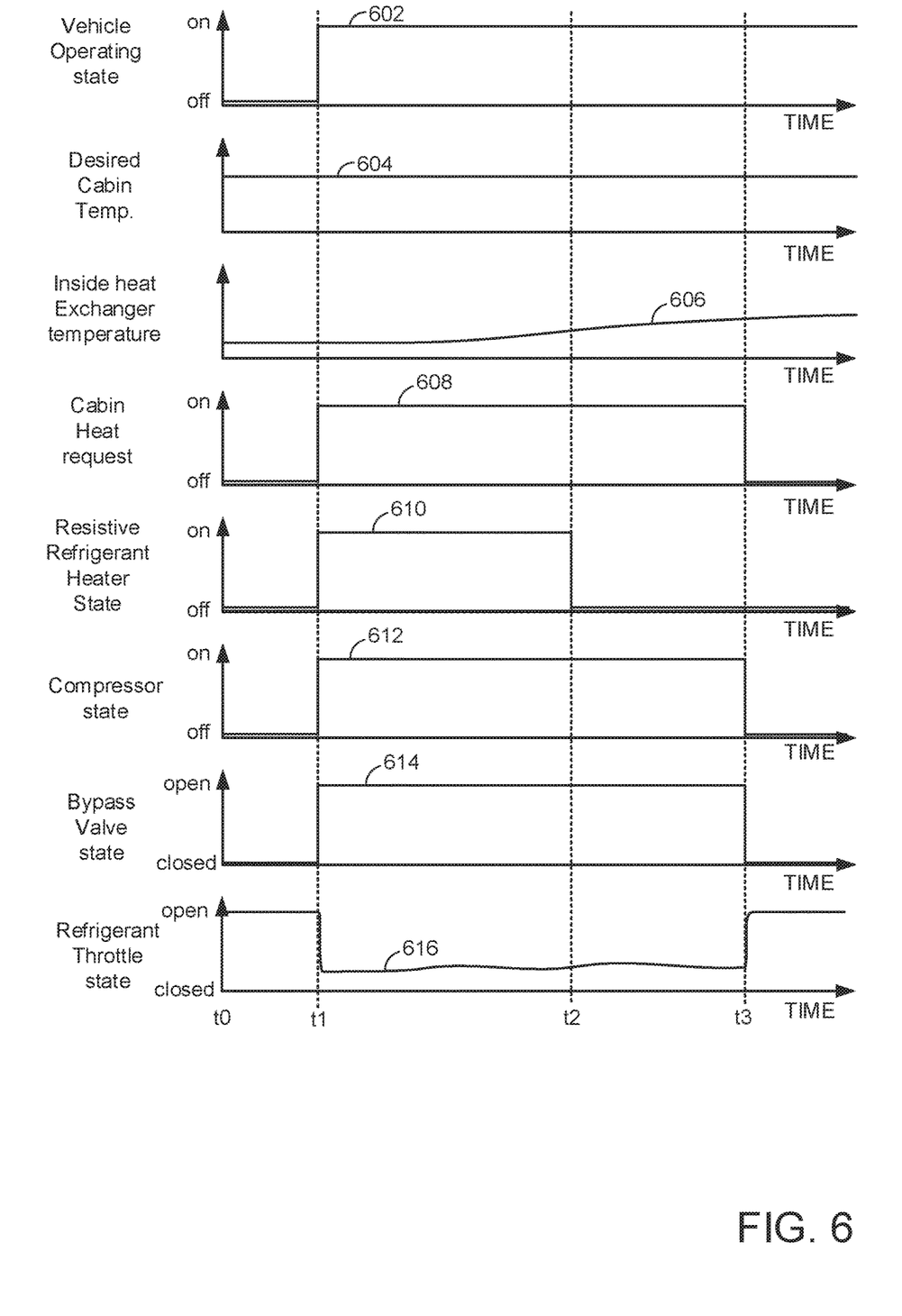
FIG. 6 shows a simulated example sequence for operating a vehicle climate control system according to the method of FIGS. 4 and 5.

Referring now to FIG. 6, an example simulated sequence for operating a vehicle heating system is shown. Vertical markers t0-t3 indicated times of interest during the operating sequence. The sequence of FIG. 6 may be provided via the system of FIGS. 1-3 in cooperation with the method of FIGS. 4 and 5.

The first plot from the top of FIG. 6 is a plot of vehicle operating state versus time. The horizontal axis represents time and time begins at the left side of the plot and increases in the direction of the horizontal axis arrow. The vertical axis represents vehicle operating state and the vehicle is activated (e.g., the engine is combusting fuel and rotating) when trace 602 is at a higher level near the vertical axis arrow. The vehicle is not activated (e.g., the engine is not combusting fuel and not rotating) when trace 602 is at a lower level near the horizontal axis.

The second plot from the top of FIG. 6 is a plot of desired passenger cabin temperature. The desired passenger cabin temperature may be input to a human/machine interface by an occupant of the vehicle. The horizontal axis represents time and time begins at the left side of the plot and increases in the direction of the horizontal axis arrow. The vertical axis represents desired passenger cabin temperature and the desired passenger cabin temperature increases in the direction of the vertical axis arrow. Trace 604 represents the desired passenger cabin temperature.

The third plot from the top of FIG. 6 is a plot of inside heat exchanger temperature versus time. The horizontal axis represents time and time begins at the left side of the plot and increases in the direction of the horizontal axis arrow. The vertical axis represents inside heat exchanger temperature and inside heat exchanger temperature increases in the direction of the vertical axis arrow. Trace 606 represents an inside heat exchanger temperature.

The fourth plot from the top of FIG. 6 is a plot of a passenger cabin heat request versus time. The horizontal axis represents time and time begins at the left side of the plot and increases in the direction of the horizontal axis arrow. The vertical axis represents the passenger cabin heat request and the passenger cabin heat request is asserted when trace 608 is at a higher level near the vertical axis arrow. The passenger cabin heat request is not asserted when trace 608 is near the horizontal axis. Trace 608 represents the passenger cabin heat request state.

The fifth plot from the top of FIG. 6 is a plot of resistive refrigerant heater state versus time. The horizontal axis represents time and time begins at the left side of the plot and increases in the direction of the horizontal axis arrow. The vertical axis represents resistive refrigerant heater state and the resistive refrigerant heater is activated when trace 610 is at a higher level near the vertical axis arrow. The resistive refrigerant heater is not activated when trace 610 is at a lower level near the horizontal axis. Trace 610 represents the resistive refrigerant heater state.

The sixth plot from the top of FIG. 6 is a plot of compressor state versus time. The horizontal axis represents time and time begins at the left side of the plot and increases in the direction of the horizontal axis arrow. The vertical axis represents compressor state and the compressor is activated (e.g., pumping refrigerant) when trace 612 is at a higher level near the vertical axis arrow. The compressor is not activated when trace 612 is at a lower level near the horizontal axis. Trace 612 represents the compressor valve state.

The seventh plot from the top of FIG. 6 is a plot of outside heat exchanger bypass valve state versus time. The horizontal axis represents time and time begins at the left side of the plot and increases in the direction of the horizontal axis arrow. The vertical axis represents outside heat exchanger bypass valve state and the outside heat exchanger bypass valve allows refrigerant to flow in the outside heat exchanger bypass passage when trace 614 is at a higher level near the vertical axis arrow. The outside heat exchanger bypass valve does not allow refrigerant to flow in the outside heat exchanger bypass passage when trace 614 is at a lower level near the horizontal axis. Trace 614 represents the outside heat exchanger bypass valve state.

The eighth plot from the top of FIG. 6 is a plot of refrigerant throttle state versus time. The horizontal axis represents time and time begins at the left side of the plot and increases in the direction of the horizontal axis arrow. The vertical axis represents refrigerant throttle state and the refrigerant throttle is fully open when trace 616 is at a higher level near the vertical axis arrow. The refrigerant throttle is fully closed when trace 616 is at the level of the horizontal axis. Trace 616 represents the refrigerant throttle state or position.

At time t0, the vehicle is not activated so the engine is not operating and the passenger cabin heat request is not asserted. The desired passenger cabin temperature is at a middle level and the inside heat exchanger temperature is low. The resistive heaters are not activated (e.g., not consuming electrical energy and generating heat) and the compressor is not activated. The outside heat exchanger bypass valve is not allowing refrigerant to flow through the outside heat exchanger bypass passage. The refrigerant throttle valve is fully open.

At time t1, the vehicle is activated responsive to human input (not shown). The desired passenger cabin temperature remains at its prior level and the inside heat exchanger temperature is unchanged. The resistive refrigerant heaters are activated in response to the vehicle being activated and the temperature difference between the desired inside heat exchanger temperature and the actual inside heat exchanger temperature (not shown). The compressor is also activated in response to the request for passenger cabin heating. The outside heat exchanger bypass valve state is changed so that refrigerant flows through the outside heat exchanger bypass passage so that the refrigerant that exits the compressor is not cooled. The refrigerant throttle is partially closed in response to the passenger cabin heat request to increase passenger cabin heating.

At time t2, a temperature difference between an actual inside heat exchanger and a desired inside heat exchanger is reduced to less than a threshold temperature (not shown) so the resistive heaters are deactivated as indicated by the resistive refrigerant heater state transitioning to a lower level. By deactivating the resistive refrigerant heaters, electric power consumption may be reduced. The vehicle remains operating and the desired passenger cabin temperature is unchanged. The inside heat exchanger temperature has increased since time t1 and the compressor remains activated. The outside heat exchanger bypass valve continues to allow refrigerant to flow in the outside heat exchanger bypass passage. The refrigerant throttle remains in a partially open state.

At time t3, the passenger cabin heat request changes to not be asserted and the compressor is deactivated in response to the passenger cabin heat request not being asserted. The outside heat exchanger bypass valve changes state to prevent refrigerant from flowing through the outside heat exchanger bypass passage. The refrigerant throttle is also fully closed in response to the passenger cabin heating request not being asserted.

In this way, a refrigerant loop may be operated to heat a vehicle passenger cabin via refrigerant that is circulated in one direction through an interior heat exchanger. The refrigerant may bypass an expansion valve when the refrigerant loop is operated in a heating mode so that refrigerant pressure is not decreased before the refrigerant passes through an interior heat exchanger.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling passenger cabin conditions, comprising:
    cooling a passenger cabin via a refrigerant in a refrigerant loop in response to a request to cool a vehicle passenger cabin;
    heating the refrigerant in the refrigerant loop via a compressor, heating the refrigerant via a resistive heater, and heating the vehicle passenger cabin via the refrigerant in response to a request to heat the vehicle passenger cabin, wherein the refrigerant is heated via the resistive heater after the refrigerant is compressed and before the refrigerant is expanded via an expansion valve;
    heating the refrigerant via engine coolant, and
    flowing coolant through an engine coolant to refrigerant heat exchanger in response to a temperature of the refrigerant exiting the engine coolant to refrigerant heat exchanger being less than a threshold temperature.

2. The method of claim 1, further comprising activating the resistive heater via a controller in response to the request to heat a passenger cabin of a vehicle.

3. The method of claim 1, further comprising flowing refrigerant from a compressor through a first refrigerant to air heat exchanger and then to an expansion valve before flowing the refrigerant through a second refrigerant to air heat exchanger and an engine coolant to refrigerant heat exchanger when cooling the passenger cabin.

4. The method of claim 3, further comprising flowing the refrigerant from the engine coolant to refrigerant heat exchanger to the compressor while engine coolant is not flowing through the engine coolant to refrigerant heat exchanger.

5. The method of claim 1, further comprising flowing refrigerant from a compressor through a first refrigerant to air heat exchanger bypass passage and then to through a second refrigerant to air heat exchanger and an engine coolant to refrigerant heat exchanger when heating the passenger cabin.

6. The method of claim 5, further comprising flowing the refrigerant from the engine coolant to refrigerant heat exchanger to the compressor while engine coolant is flowing through an engine coolant to refrigerant heat exchanger.

7. A method for controlling passenger cabin conditions, comprising:
    cooling a passenger cabin via a refrigerant in a refrigerant loop in response to a request to cool a passenger cabin, the refrigerant changing from a gaseous phase to a liquid phase when the passenger cabin is being cooled; and
    heating the refrigerant in the refrigerant loop via a compressor, heating the refrigerant via a first resistive heater, and heating a passenger cabin via the refrigerant in response to a request to heat the passenger cabin, the refrigerant maintained in the gaseous phase throughout the refrigerant loop when the passenger cabin is being heated, wherein the first resistive heater is positioned in a bypass line of a first refrigerant to air heat exchanger, and wherein the bypass line extends from a bypass valve of a first refrigerant to air heat exchanger to a passage that extends from an expansion valve to a second refrigerant to air heat exchanger.

8. The method of claim 7, further comprising heating the refrigerant via the second resistive heater and an engine coolant to refrigerant heat exchanger in response to the request to heat the passenger cabin, wherein the refrigerant is heated via engine coolant in the engine coolant to refrigerant heat exchanger, the engine coolant to refrigerant heat exchanger positioned upstream of the second resistive heater according to a direction of refrigerant flow.

9. The method of claim 7, further comprising fully opening a refrigerant throttling valve via a controller while cooling the passenger cabin.

10. The method of claim 9, further comprising partially closing the refrigerant throttling valve via the controller while heating the passenger cabin.

11. The method of claim 10, further comprising reducing a displacement of the compressor via the controller in response to a pressure at an outlet of the compressor exceeding a first threshold.

12. The method of claim 11, further comprising reducing a displacement of the compressor via the controller in response to a pressure at an inlet of the compressor exceeding a second threshold.

13. The method of claim 12, further comprising flowing coolant through an engine coolant to refrigerant heat exchanger in response to the request to heat the passenger cabin.

* * * * *